UNITED STATES PATENT OFFICE.

CHARLES G. JOHNSON, OF NASHVILLE, TENNESSEE.

PROCESS OF MAKING BUTTER.

No. 909,802.  Specification of Letters Patent.  Patented Jan. 12, 1909.

Application filed June 17, 1908. Serial No. 438,996.

*To all whom it may concern:*

Be it known that I, CHARLES G. JOHNSON, a citizen of the United States, residing at Nashville, in the county of Davidson and State of Tennessee, have invented new and useful Improvements in Processes for Making Butter, of which the following is a specification.

This invention is an improved process for making butter directly from fresh cream without the necessity of causing the cream to ferment and also without the necessity of churning the same and the said invention consists in first cooling freshly drawn milk then slowly heating the same to within about twenty degrees of the boiling point, maintaining the same at such temperature for about forty-five minutes, then cooling to cause the cream or butter fat to gather, and then removing the cream or butter fat and working the same to convert it into butter as hereinafter described.

In accordance with my improved process, I take freshly drawn sweet milk, which is freshly strained and then cooled and afterward heated over a fire sufficient to bring the milk to within about twenty degrees of the boiling point or to a temperature of about one hundred and ninety-two degrees Fahrenheit, in about 30 minutes. The milk is kept heated to such temperature for about forty-five minutes and is not permitted at any time to reach the boiling point. Such heating of the milk causes the cream or butter fat to gather on the surface thereof and the milk is then cooled to a temperature of about one hundred and sixty to one hundred and seventy degrees Fahrenheit and the cream or butter fat removed therefrom and "worked" with a butter paddle or other suitable instrument for a minute or two, the exact time being governed by the condition of the cream or butter fat, to convert the same into butter. The milk is then washed out of the butter in the customary manner and the butter salted to taste. Butter thus made will be found to be perfectly sweet and will keep sweet for a longer period of time than butter made by the usual churning process. Furthermore, my improved process of making butter does not require the souring of the milk, as the milk from which the butter is taken by my process will be found to be perfectly sweet. A very superior quality of butter milk may be obtained, if desired, by setting the milk from which the butter has been taken by my process aside until it becomes converted to clabber.

I claim:—

1. The herein described process of making butter consisting in heating sweet milk to a temperature somewhat lower than the boiling point, maintaining the milk at such temperature until the cream or butter fat gathers, cooling the milk, and finally removing and working the cream or butter fat before fermentation ensues.

2. The herein described process of making butter consisting in heating sweet milk to the temperature of about twenty degrees less than boiling point, maintaining the milk at such temperature for about forty-five minutes, cooling the milk and removing and working the cream and butter fat before fermentation ensues.

3. The herein described process of making butter consisting in gradually heating freshly drawn sweet milk to the temperature of about one hundred ninety-two degrees, preserving the milk at such temperature for about forty-five minutes to cause the cream or butter fat to gather on the surface of the milk, then cooling the milk to a temperature of about one hundred sixty degrees and removing and working the cream or butter fat before fermentation ensues.

In testimony whereof I affix my signature in presence of two witnesses.

CHARLES G. JOHNSON.

Witnesses:
 WM. PEAK,
 J. A. SNODDY.